US012739164B2

(12) United States Patent
Gupta et al.

(10) Patent No.: US 12,739,164 B2
(45) Date of Patent: Sep. 15, 2026

(54) HIGH AVAILABILITY OF HOST DATA PATH WITH TUNNELING IN SOFTWARE DEFINED NETWORKS

(71) Applicant: MICROSOFT TECHNOLOGY LICENSING, LLC, Redmond, WA (US)

(72) Inventors: Avijit Gupta, Redmond, WA (US); Deepak Bansal, Bellevue, WA (US); Kaixiang Miao, Redmond, WA (US); Rishabh Tewari, Sammamish, WA (US); Weixi Chen, Berkeley, CA (US); Guohan Lu, Redmond, WA (US); Lihua Yuan, Redmond, WA (US); Shahzad Iqbal, Redmond, WA (US); Prince Sunny, Redmond, WA (US); Arun Jeedigunta Venkata Satya, Redmond, WA (US); Zexuan Zhao, Redmond, WA (US); Venkata Satish Katta, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 330 days.

(21) Appl. No.: 18/373,202

(22) Filed: Sep. 26, 2023

(65) Prior Publication Data

US 2025/0047552 A1 Feb. 6, 2025

Related U.S. Application Data

(60) Provisional application No. 63/530,047, filed on Jul. 31, 2023.

(51) Int. Cl.
*H04L 41/0668* (2022.01)
*H04L 12/46* (2006.01)
(Continued)

(52) U.S. Cl.
CPC ...... *H04L 41/0668* (2013.01); *H04L 12/4633* (2013.01); *H04L 41/0806* (2013.01); *H04L 45/76* (2022.05)

(58) Field of Classification Search
CPC . H04L 41/0668; H04L 45/76; H04L 12/4633; H04L 41/0806
(Continued)

(56) References Cited

U.S. PATENT DOCUMENTS 7,934,020 B1 * 4/2011 Xu ........................ G06F 21/554 709/250
8,665,747 B2 * 3/2014 Elsen ...................... H04L 45/18 718/1
(Continued)

FOREIGN PATENT DOCUMENTS

WO 2017118880 A1 7/2017
WO WO-2025052418 A1 * 3/2025 ......... H04L 61/5092

OTHER PUBLICATIONS

International Search Report and Written Opinion received for PCT Application No. PCT/US2024/037486, Oct. 1, 2024, 14 pages.
(Continued)

*Primary Examiner* — Anthony Mejia
(74) *Attorney, Agent, or Firm* — Han Gim; Newport IP, LLC

(57) ABSTRACT

Techniques are described for managing connection states at an active network appliance and a backup network appliance. The active network appliance and backup network appliance are configured to process connections in a software defined network (SDN). The active network appliance is configured to actively process connections, and the backup network appliance maintains connection states such
(Continued)

that the backup network appliance can actively process connections in response to a failure of the active network appliance.

20 Claims, 7 Drawing Sheets

(51) Int. Cl.
*H04L 41/0806* (2022.01)
*H04L 45/76* (2022.01)

(58) Field of Classification Search
USPC .......................................................... 370/219
See application file for complete search history.

(56) References Cited

U.S. PATENT DOCUMENTS 11,038,745 B1 * 6/2021 Vasquez .................. H04L 69/40
11,757,782 B2 * 9/2023 Degrace .............. H04L 41/0668 709/221
11,792,116 B1 * 10/2023 Dickinson ........... H04L 41/0897 370/392
12,267,364 B2 * 4/2025 Rolando ................. H04L 63/20
12,278,740 B2 * 4/2025 Joshi ...................... G06Q 50/10
2012/0259972 A1 * 10/2012 Bafna ................. H04L 41/0853 709/224
2015/0089331 A1 * 3/2015 Skerry ................ G06F 11/2289 714/799
2016/0127454 A1 * 5/2016 Maheshwari ........... H04L 67/10 709/223
2019/0149411 A1 * 5/2019 Rewaskar ........... H04L 41/0816 709/221
2019/0253274 A1 * 8/2019 Van Dussen ........ H04L 12/4641
2022/0329520 A1 * 10/2022 Degrace .................. H04L 45/12
2025/0370794 A1 * 12/2025 Yin ....................... G06F 9/4881
2026/0005923 A1 * 1/2026 Odoom ................. G06F 9/5072

OTHER PUBLICATIONS

U.S. Appl. No. 63/530,047, filed Jul. 31, 2023.
International Preliminary Report on Patentability received for PCT Application No. PCT/US2024/037486, mailed on Feb. 12, 2026, 09 pages.

* cited by examiner

HIGH AVAILABILITY OF HOST DATA PATH WITH TUNNELING IN SOFTWARE DEFINED NETWORKS

PRIORITY APPLICATION

This application claims the benefit of and priority to U.S. Provisional Application No. 63/530,047, filed Jul. 31, 2023, the entire contents of which are incorporated herein by reference.

BACKGROUND

A data center houses computer systems and various networking, storage, and other related components. Data centers are used by service providers to provide computing services to businesses and individuals as a remote computing service or provide software as a service (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

Software defined networks (SDNs) provide managed and privileged software that enables secure separation of data and applications between users or tenants of cloud networks via policies. Many cloud architectures offload networking stack tasks for implementing policies such as tunneling for virtual networks. By offloading packet processing tasks to hardware-based network devices such as a smart network interface card (sNIC) or an SDN appliance or data processing unit (DPU) comprising multiple sNICs, the capacity of CPU cores can be reserved for running cloud services and reducing latency and variability to network performance. The use of such appliances requires high availability and must be resilient to the failure of single TOR/single sNIC, which can be achieved through cross wiring with dual TORs. However, the cross-wiring design by itself does not provide data path resiliency in the event of a card failure if every card contains only unique virtual machine (VM) policy goal states.

Disclosed herein are systems and methods for providing resiliency in the event of card or device failures, where the policy goal state of VMs is programmed into two cards or devices-a primary card or device and a backup card or device. In the event that the primary card or device is lost, the backup card or device can resume data traffic and maintain existing flows. The backup card or device becomes the new primary in the event of failure of the current primary, or for other operational reasons.

In an example, the connection state can be for a TCP connection. The card or device is configured to perform policy enforcement, packet transformations, and/or packet forwarding in a communications network. The primary and backup card or device preserves the connection state in the event of fail-over in order to prevent the connections that are currently being processed from having to reset and re-establish after the fail-over. As the card or device can process up to millions of connections per second, switching between primary and backup cards/devices must be very efficient.

The present disclosure provides techniques to allow for efficiency improvements in communicating connection state across two such devices, creating a highly available connection state backup. The described techniques can allow for virtual computing environments to support a variety of configurations while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The disclosed embodiments enable datacenters to provide services in a manner that can reduce the cost and complexity of their networks, allowing for more efficient use of computing, storage, and network resources. Efficient implementation of the end-to-end service by a cloud service provider can enable an experience that is seamless and more consistent across various footprints. The efficient implementation of the described techniques can provide improvements for various performance and security metrics such as latency and data security.

Methods for creating a fast path connection record can be similar to what is commonly referred to as “slow path” as described in Disaggregated APIs for SONIC Hosts (DASH) open-source documentation found within the Github. Connection flows can be re-simulated using the techniques described in application Ser. No. 17/855,730 “RE-SIMULATION OF UPDATED SDN CONNECTION FLOWS” filed Jun. 30, 2022, the contents of which are incorporated herein by reference.

Figure 1:
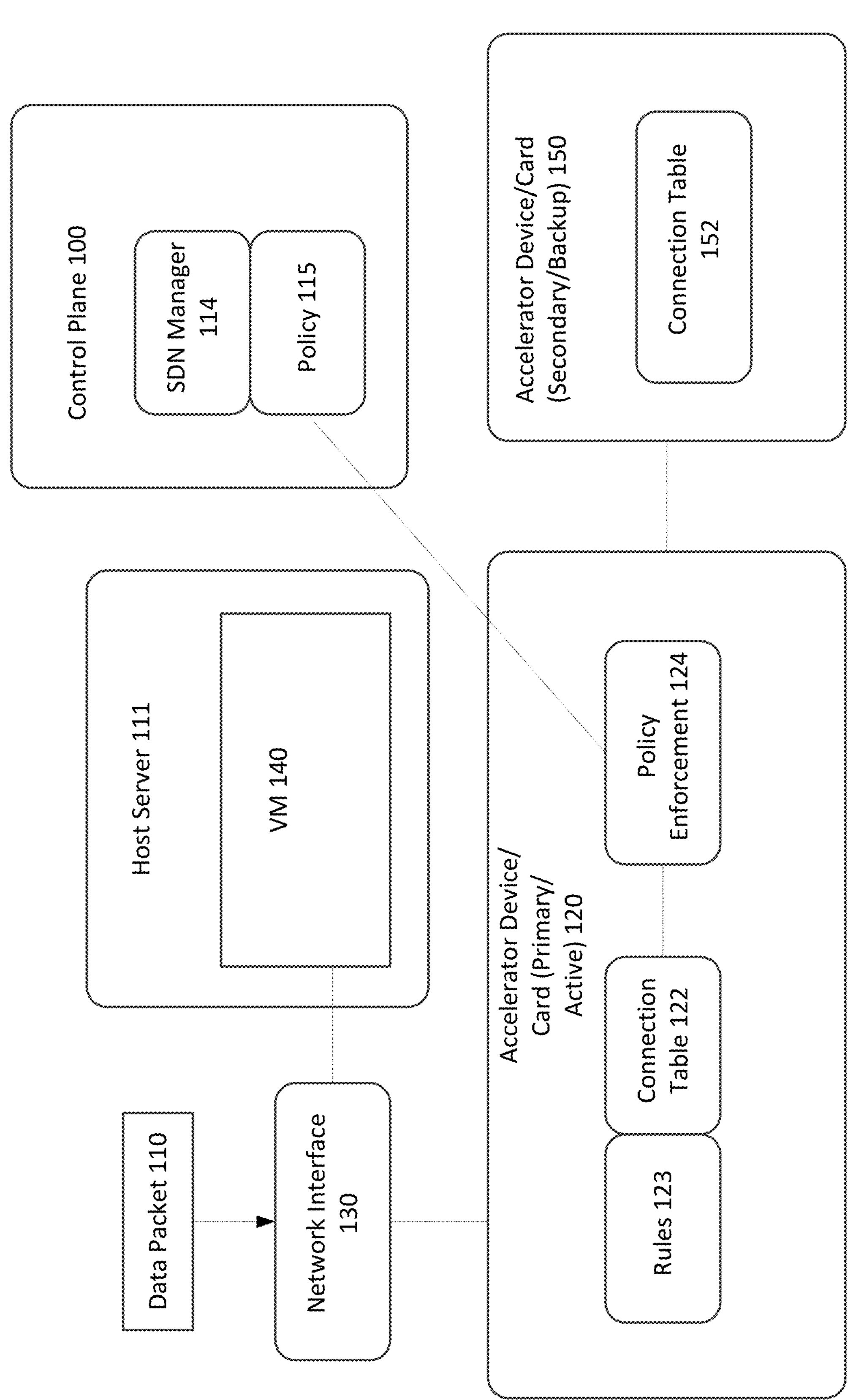
FIG. 1 is a diagram illustrating an example system diagram in accordance with the present disclosure.

As used herein, an active device and backup device that are configured to track connections in a software defined network (SDN) may include network devices, appliances, and other devices that are implemented for processing packets in SDNs and other architectures that require processing of packets that are associated with various session and connections. For example, with reference to FIG. 1, illustrated is an example architecture illustrating packet processing with active and backup devices. In one example, a packet 110 in a flow may be received via a network interface 130. Network interface 130 may be communicatively coupled to VM 140 hosted by host server 111. The packet 110 may be identified and sent to a primary/active hardware-based accelerator device 120 that is configured to perform processing of data flows in the fast path and managed by SDN manager 114, as further described herein. The fast path connections may be inserted into a connection table 122 which may run rules 123. The primary/active hardware-based accelerator device 120 may apply applicable policies 124 for the data flow associated with the data packet 110 and terminate application of the policies when the data flow is complete. Policy enforcement 124 may be applied for SDN policies 115 that are received, for example, from the SDN control plane 100. A secondary/backup hardware-based accelerator device 150 may be communicatively coupled to primary/active hardware-based accelerator device 120 and synchronize its connection table 152 with connection table 122 of primary/active hardware-based accelerator device 120 in accordance with the techniques described herein.

The following describes one embodiment for achieving data path resiliency in the event of a card failure or a failure of a primary card or device.

1. Network interfaces from a single virtual machine (VM) are provisioned on multiple cards on one SDN appliance. As used herein, an SDN appliance can include one or more cards or devices that are configured to process packets in the manner described herein, which can include an appliance or switch and optionally a server or other computing device.
2. A card on a first SDN appliance (which can be referred to as SDN appliance 1) is paired with a card from a second SDN appliance (which can be referred to as SDN appliance 2). In an embodiment, each card for a given SDN appliance participates only in a single pairing relationship.
3. Pairwise flow replication is implemented for each paired card.
4. A single card is configured to handle multiple network interfaces.
5. Some network interfaces on the same card are in an active mode, and some other network interfaces on the same card are in the passive mode.
6. Network interface-based (not card-based) flow replication is performed from the card with the active network interfaces to the card with the passive network interfaces.

For the above-described resiliency scheme, the correct traffic should be sent to the active appliance. Border Gateway Protocol (BGP) is one way to ensure that the correct traffic is sent to the active appliance. However, BGP can be difficult to scale because route explosion can occur on some network devices (e.g., Tier1 devices). Additionally, the secondary appliance or card can end up receiving traffic which can cause unnecessary packet drops.

The present disclosure further provides a tunneling technique where each and every card does not advertise BGP. BGP is advertised not as a single unique IP address, but as a larger block. Thus, whenever a packet actually arrives at a particular Tier1 device, the Tier1 device is able to route the packet based on the correct routes by performing another level of encapsulation and sending the packet to the correct destination and leaking the routes. The present disclosure includes several embodiments to address the described issues, including advertising BGP with higher prepends for the backup appliance, redirecting traffic to the correct appliance via a VXLAN tunnel, and using control plane probes to change network interface traffic routing.

Advertising BGP with Prepends, Higher Prepend for Backup Card

Figure 2:
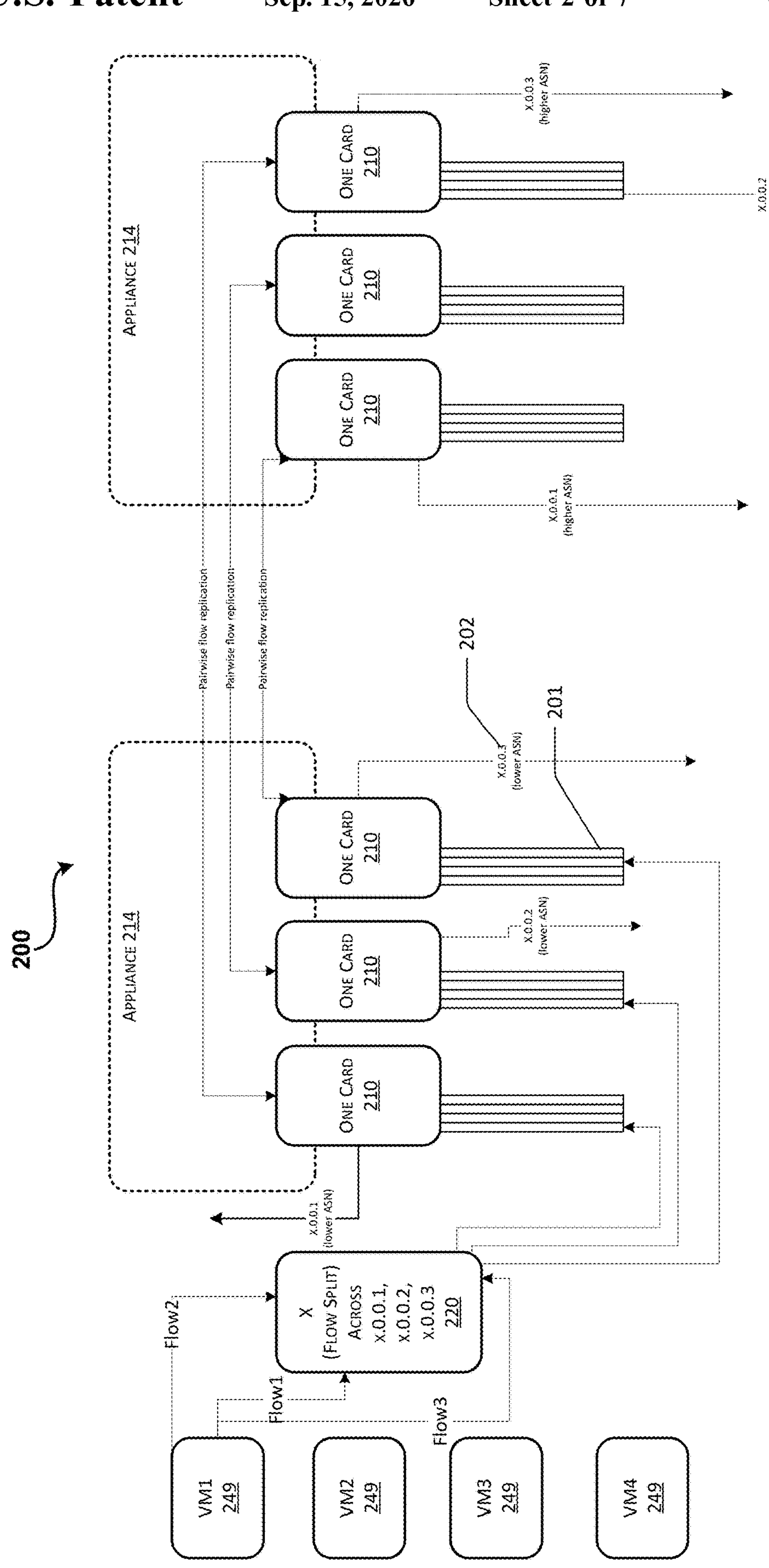
FIG. 2 is a diagram illustrating an example system diagram in accordance with the present disclosure.

With reference to system 200 of FIG. 2, each card 210 of appliance 214 acts as primary for some elastic network interfaces (ENIs) 201 and as a backup for some other set of ENIs. Each card 210 can use autonomous system number (ASN) prepend 202 to softly indicate the preference of a route. Thus, a primary card can advertise BGP with no ASN prepend while a secondary card can advertise BGP with prepend.

A card 210 that advertises BGP with a smaller prepend is expected to receive all of the data path traffic from VMs 249 until that card goes down, in which case BGP routes with a higher prepend route the packets to the secondary card.

The above-described method is efficient to implement and only requires a minor change to BGP advertisements.

Redirect Traffic Via a VXLAN Tunnel

Figure 3:
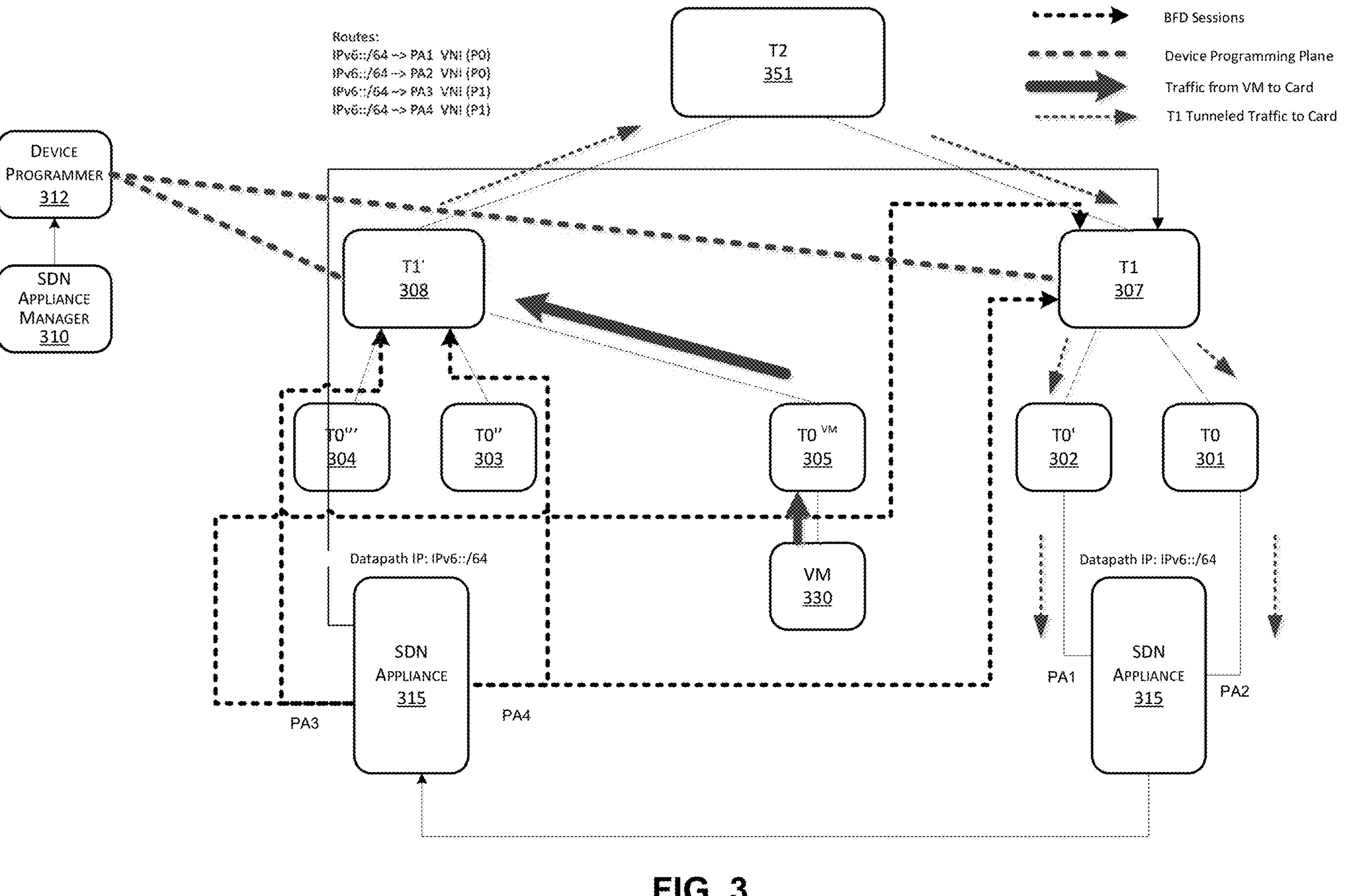
FIG. 3 is a diagram illustrating an example system diagram in accordance with the present disclosure.

With reference to FIG. 3, Tier1 devices (shown as T1 307 and T1' 308) connected to configured racks are aware of all routes to the cards and their priorities. The primary route will have a higher priority than secondary routes. Routes to be tunneled are determined on top-of-rack devices (ToRs) shown as T0 301, T0' 302, T0'' 303, T0''' 304, and T0VM 305. The routes can be determined based on parameters provided by an SDN appliance manager 310. This can be performed by a device programmer 312. These identified routes are tunnel routes, and in response to being matched, the matched packets are encapsulated to SDN cards in SDN appliances 315. The encapsulation can be performed by the Tier 1 device.

Each card is connected to Tier1 devices directly via Bidirectional Forwarding Detection (BFD). BFD acts as a keep alive mechanism, and if a BFD session from a card is valid and alive, the route can be maintained on the Tier1 devices (T1 307 and T1' 308).

When the primary card goes down, the corresponding BFD session ends, and hence the primary route becomes inactive. During this time period, the secondary route becomes active. Upon recovery of the primary card, there are two options. The data path immediately moves back to the primary. The BFP can be controlled and established after flows from the secondary card have been established on the primary. Alternatively, data path traffic continues following secondary routes and are delivered to secondary cards.

In some embodiments, an application programming interface (API) can be implemented which is configured to accept priority and routing information. The SDN appliance 315 or device programmer 312 configures routes as primary or secondary. Additionally, there can be multiple primary routes and multiple secondary routes. In an embodiment, when multiple primary and secondary routes are implemented, the Tier1 device performs equal-cost multi-path routing (ECMP) on all routes.

In an embodiment, the SDN appliance 315 or device programmer 312 is further configured to discover Tier1 devices in the region that are to be programmed with SDN appliance routes. The SDN appliance 315 or device programmer 312 is further configured to determine the Tier1 devices with which it needs to establish BFD sessions. Additionally, the cards are configured to receive encapsulated packets and decapsulate a packet that is received with a given virtual network interface (VNI).

By redirecting traffic via a VXLAN tunnel, there is no dependency on BGP, and route leaking is not needed. Additionally, faster convergence time may be possible compared to BGP.

Control Plane Probe to Change ENI Traffic Routing

In an embodiment, every SDN appliance card advertises the primary BGP IP address. An SDN appliance manager 310 that is configured to manage various SDN appliances 315 and devices as described herein probes the SDN appliances 315 for health statistics. When the SDN appliance 315 is detected to be unhealthy, the SDN appliance manager 310 updates customer address (CA) to physical address (PA) mapping for all ENIs that are considered primary on that SDN appliance 315 to the backup ENIs. Traffic from the VM 330 is then sent to the backup appliance. The SDN cards provide support for flow replication in both directions.

In a further embodiment, BGP without prepend can be advertised by both primary and secondary cards. BGP will be anycast, so connections can go on either primary and secondary card. However, connections generally go to the same card unless physical network rehash occurs. In this embodiment, flow replication is provided from secondary to primary cards.

Figure 4:
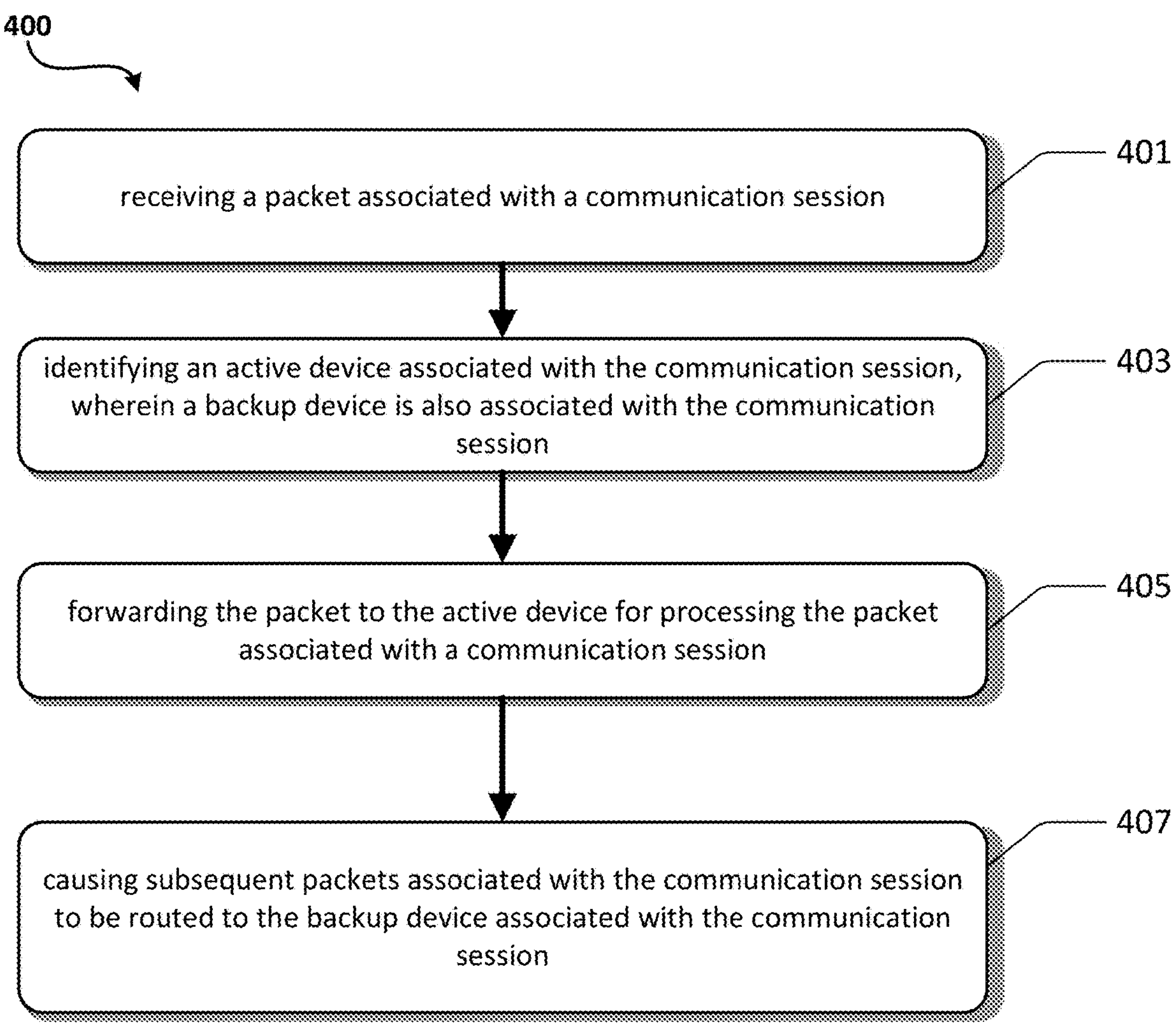
FIG. 4 is a flowchart depicting an example procedure in accordance with the present disclosure.

Turning now to FIG. 4, illustrated is an example operational procedure for managing an active and backup device configured to track connections in a software defined network (SDN) of a virtual computing environment.

Such an operational procedure can be provided by one or more components illustrated in FIGS. 1-3. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 400 is described as running on a system, it can be appreciated that the routine 400 and other operations described herein can be executed on an individual computing device or several devices.

Referring to FIG. 4, operation 401 illustrates receiving a packet associated with a communication session.

Operation 401 may be followed by operation 403. Operation 403 illustrates identifying an active device associated with the communication session, wherein a backup device is also associated with the communication session.

Operation 403 may be followed by operation 405. Operation 405 illustrates forwarding the packet to the active device for processing the packet associated with a communication session.

Operation 405 may be followed by operation 407. Operation 407 illustrates in response to determining that the active device has failed, causing subsequent packets associated with the communication session to be routed to the backup device associated with the communication session, thereby allowing the backup device to maintain connection state information and avoid performing connection state processing for the communication session.

Referring to the appended drawings, in which like numerals represent like elements throughout the several FIGURES, aspects of various technologies for network disaggregation techniques and supporting technologies will be described. In the following detailed description, references are made to the accompanying drawings that form a part hereof, and which are shown by way of illustration specific configurations or examples.

Figure 5:
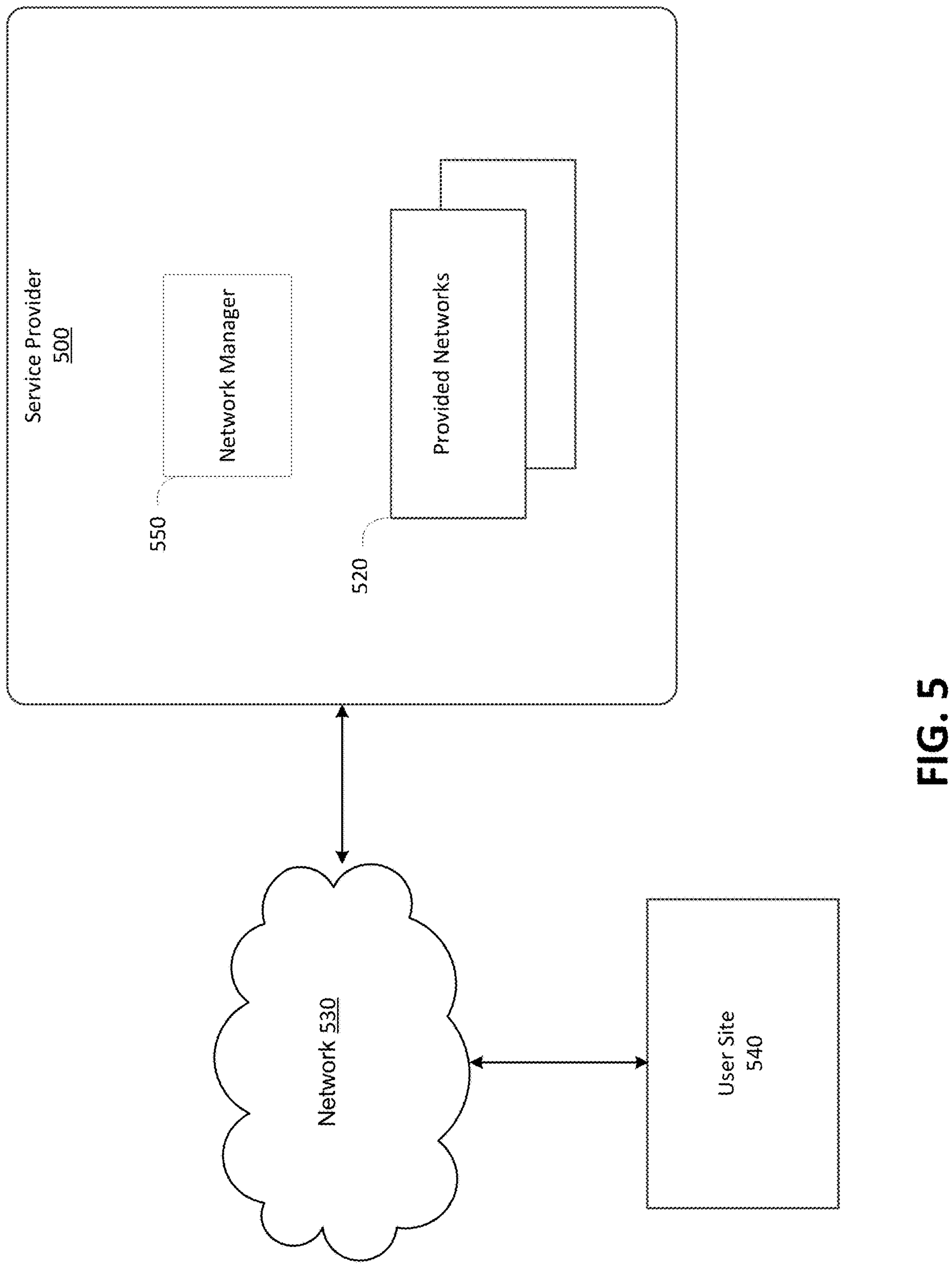
FIG. 5 is a diagram illustrating a data center in accordance with the present disclosure.

FIG. 5 illustrates an example computing environment in which the embodiments described herein may be implemented. FIG. 5 illustrates a service provider 500 that is configured to provide computing resources to users at user site 540. The user site 540 may have user computers that may access services provided by service provider 500 via a network 530. The computing resources provided by the service provider 500 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 500 may have various computing resources including servers, routers, and other devices that may provide remotely accessible computing and network resources using, for example, virtual machines. Other resources that may be provided include data storage resources. Service provider 500 may also execute functions that manage and control allocation of network resources, such as a network manager 550.

Network 530 may, for example, be a publicly accessible network of linked networks and may be operated by various entities, such as the Internet. In other embodiments, network 530 may be a private network, such as a dedicated network that is wholly or partially inaccessible to the public. Network 530 may provide access to computers and other devices at the user site 540.

Figure 6:
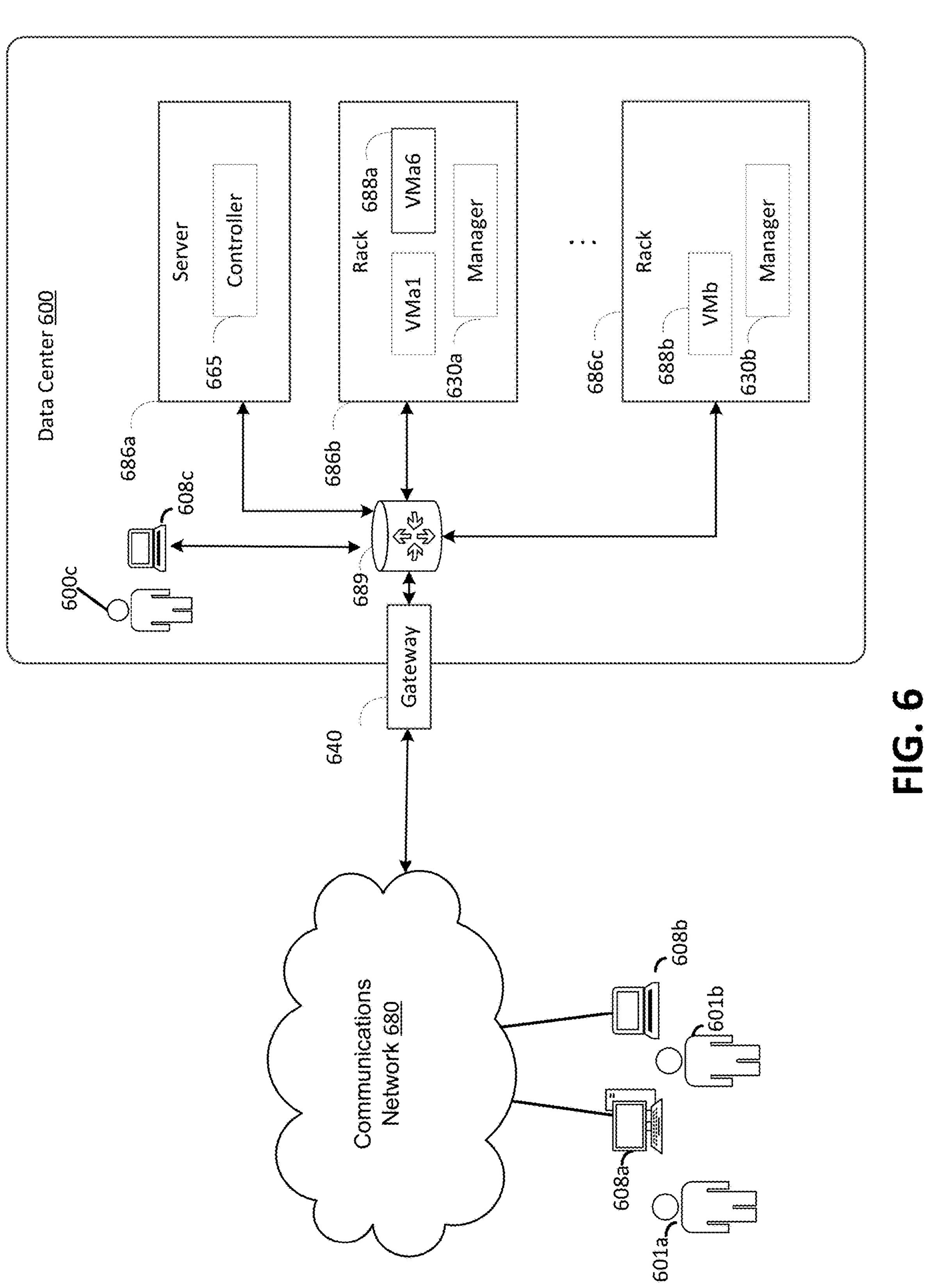
FIG. 6 is a diagram illustrating an example system in accordance with the present disclosure.

FIG. 6 illustrates an example computing environment in which the embodiments described herein may be implemented. FIG. 6 illustrates a data center 600 that is configured to provide computing resources to users 601*a*, 601*b*, or 601*c*

(which may be referred herein singularly as "a user 601" or in the plural as "the users 601") via user computers 608*a*, 608*b*, and 608*c* (which may be referred herein singularly as "a computer 608" or in the plural as "the computers 608") via a communications network 680. The computing resources provided by the data center 600 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 600 may correspond to service provider 500 in FIG. 5. Data center 600 may include servers 686*a*, 686*b*, and 686*c* (which may be referred to herein singularly as "a server 686" or in the plural as "the servers 686") that may be standalone or installed in server racks, and provide computing resources available as virtual machines 688*a* and 688*b* (which may be referred to herein singularly as "a virtual machine 688" or in the plural as "the virtual machines 688"). The virtual machines 688 may be configured to execute applications such as Web servers, application servers, media servers, database servers, and the like. Other resources that may be provided include data storage resources (not shown on FIG. 6) and may include file storage devices, block storage devices, and the like. Servers 686 may also execute functions that manage and control allocation of resources in the data center, such as a controller 665. Controller 665 may be a fabric controller or another type of program configured to manage the allocation of virtual machines on servers 686.

Referring to FIG. 6, communications network 680 may, for example, be a publicly accessible network of linked networks and may be operated by various entities, such as the Internet. In other embodiments, communications network 680 may be a private network, such as a corporate network that is wholly or partially inaccessible to the public.

Communications network 680 may provide access to computers 608. Computers 608 may be computers utilized by users 601. Computer 608*a*, 608*b* or 608*c* may be a server, a desktop or laptop personal computer, a tablet computer, a smartphone, a set-top box, or any other computing device capable of accessing data center 600. User computer 608*a* or 608*b* may connect directly to the Internet (e.g., via a cable modem). User computer 608*c* may be internal to the data center 600 and may connect directly to the resources in the data center 600 via internal networks. Although only three user computers 608*a*,608*b*, and 608*c* are depicted, it should be appreciated that there may be multiple user computers.

Computers 608 may also be utilized to configure aspects of the computing resources provided by data center 600. For example, data center 600 may provide a Web interface through which aspects of its operation may be configured through the use of a Web browser application program executing on user computer 608. Alternatively, a stand-alone application program executing on user computer 608 may be used to access an application programming interface (API) exposed by data center 600 for performing the configuration operations.

Servers 686 may be configured to provide the computing resources described above. One or more of the servers 686 may be configured to execute a manager 630*a* or 630*b* (which may be referred herein singularly as "a manager 630" or in the plural as "the managers 630") configured to execute the virtual machines. The managers 630 may be a virtual machine monitor (VMM), fabric controller, or another type of program configured to enable the execution of virtual machines 688 on servers 686, for example.

It should be appreciated that although the embodiments disclosed above are discussed in the context of virtual machines, other types of implementations can be utilized with the concepts and technologies disclosed herein.

In the example data center 600 shown in FIG. 6, a network device 689 may be utilized to interconnect the servers 686*a* and 686*b*. Network device 689 may comprise one or more switches, routers, or other network devices. Network device 689 may also be connected to gateway 640, which is connected to communications network 680. Network device 689 may facilitate communications within networks in data center 600, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 1000 described in FIG. 10 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
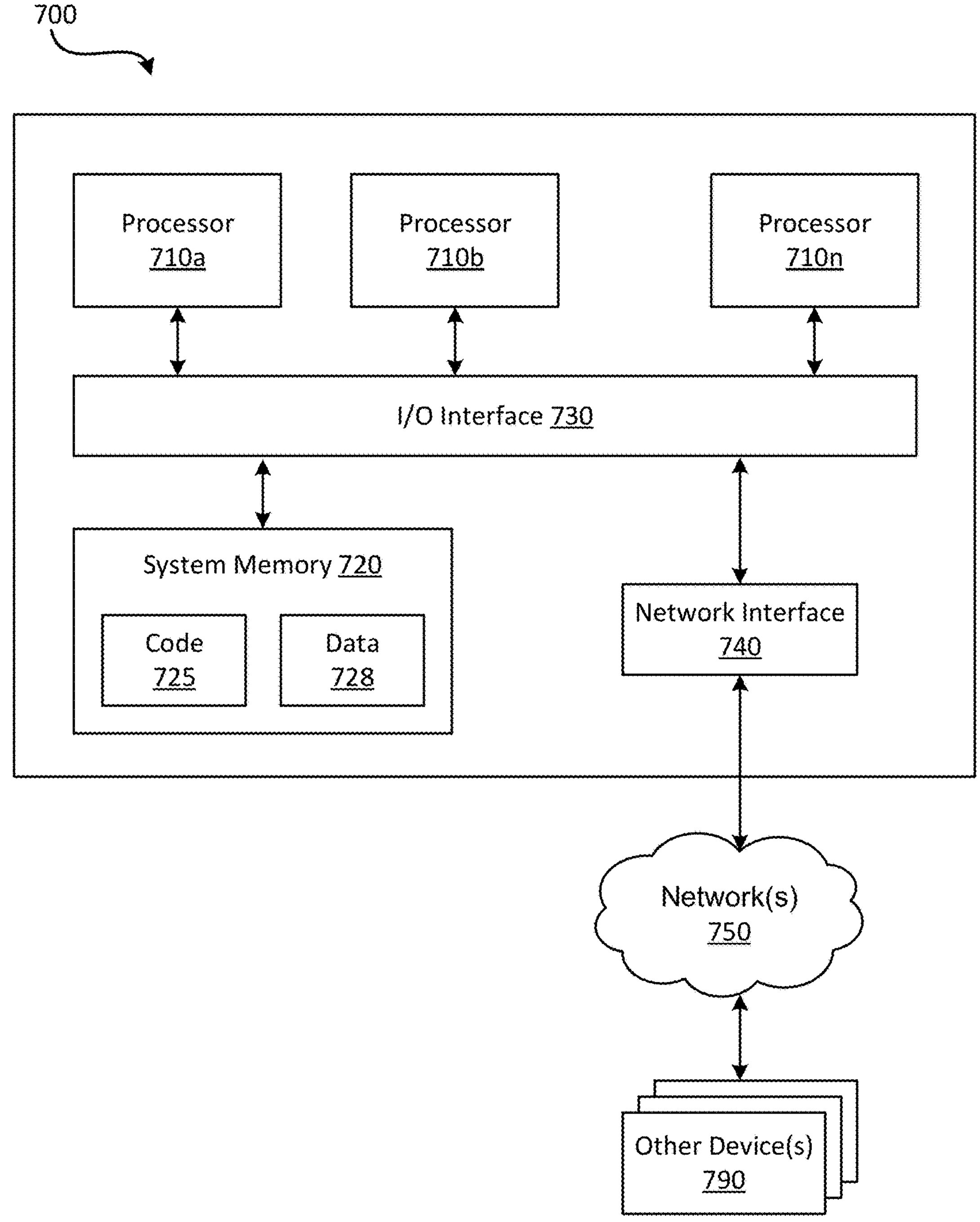
FIG. 7 is a diagram illustrating an example architecture in accordance with the present disclosure.

FIG. 7 illustrates a general-purpose computing device 700. In the illustrated embodiment, computing device 700 includes one or more processors 710*a*, 710*b*, and/or 710*n* (which may be referred herein singularly as "a processor 710" or in the plural as "the processors 710") coupled to a system memory 77 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 77 may be configured to store instructions and data accessible by processor(s) 710. In various embodiments, system memory 77 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 728.

In one embodiment, I/O interface 730 may be configured to coordinate I/O traffic between the processor 710, system memory 77, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 790 attached to a network or network(s) 750, such as other computer systems or devices as illustrated in FIGS. 1 through 5, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the corner-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 11, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

The disclosure presented herein also encompasses the subject matter set forth in the following clauses:

Clause 1: A method for managing connection states at an active network appliance and a backup network appliance, the active network appliance and backup network appliance configured to process connections in a software defined network (SDN), wherein the active network appliance is configured to actively process connections, and the backup network appliance maintains connection states such that the backup network appliance can actively process connections in response to a failure of the active network appliance, wherein network interfaces from a single virtual machine (VM) are provisioned on multiple network interface devices at each of the active and backup network appliances, the method comprising:

receiving, at the active network appliance, a packet associated with a communication session of the VM;

identifying an active network interface device on the active network appliance associated with the communication session, wherein a backup network interface device on the backup network appliance is also associated with the communication session;

forwarding the packet to the active network interface device for processing the packet associated with the communication session; and in response to determining that the active network interface device has failed, causing subsequent packets associated with the communication session to be routed to the backup network interface device associated with the communication session, thereby allowing the backup network interface device to maintain connection state information and avoid performing connection state processing for the communication session.

Clause 2: The method of clause 1, wherein the identifying is based on an autonomous system number (ASN) prepend that indicates preference of a route.

Clause 3: The method of any of clauses 1-2, wherein the routing is performed using a VXLAN tunnel.

Clause 4: The method of any of clauses 1-3, wherein the determining is based on probing the primary and active network interface device and wherein the causing is based on updating CA to PA mapping.

Clause 5: The method of any of clauses 1-4, further comprising advertising BGP without prepend by the primary and secondary network interface devices.

Clause 6: The method of any of clauses 1-5, wherein the network appliances are SDN appliances.

Clause 7: The method of clauses 1-6, wherein a network interface device on the primary SDN appliance is paired with a network interface device from the backup SDN appliance.

Clause 8: The method of any of clauses 1-7, wherein pairwise flow replication is implemented for each paired network interface device.

Clause 9: A system comprising:

an active network appliance; and a backup network appliance;

wherein the active network appliance and backup network appliance are configured to process connections in a software defined network (SDN), wherein the active network appliance is configured to actively process connections, and the backup network appliance maintains connection states such that the backup network appliance can actively process connections in response to a failure of the active network appliance, wherein network interfaces from a single virtual machine (VM) are provisioned on multiple network interface devices at each of the network appliances; the system configured to perform operations comprising:

receiving a packet associated with a communication session of the VM;

identifying an active network interface device on the active network appliance associated with the communication session, wherein a backup network interface device on the backup network appliance is also associated with the communication session;

forwarding the packet to the active network interface device for processing the packet associated with the communication session; and in response to determining that the active network interface device has failed, causing subsequent packets associated with the communication session to be routed to the backup network interface device associated with the communication session, thereby allowing the backup network interface device to maintain connection state information and avoid performing connection state processing for the communication session.

Clause 10: The system of clause 9, wherein the identifying is based on an autonomous system number (ASN) prepend that indicates preference of a route.

Clause 11: The system of any of clauses 9 and 10, wherein the routing is performed using a VXLAN tunnel.

Clause 12: The system of any of clauses 9-11, wherein the determining is based on probing the primary and active network interface device and wherein the causing is based on updating CA to PA mapping.

Clause 13: The system of any of clauses 9-12, wherein the system is configured to perform operations comprising advertising BGP without prepend by the primary and secondary network interface devices.

Clause 14: The system of any of clauses 9-13, wherein the network appliances are SDN appliances.

Clause 15: The system of any of clauses 9-14, wherein a network interface device on the primary SDN appliance is paired with a network interface device from the backup SDN appliance.

Clause 16: The system of any clauses 9-15, wherein pairwise flow replication is implemented for each paired network interface device.

Clause 17: A network appliance comprising a plurality of network interface devices, wherein the network appliance is configured to process connections in a software defined network (SDN), wherein the network appliance is configured to actively process connections, wherein the network appliance includes an active network interface device communicatively coupled to a backup network interface device that maintains connection states such that the backup network interface can actively process connections in response to a failure of the active network interface, wherein network interfaces from a single virtual machine (VM) are provisioned on multiple network interface devices at the network appliance, the network appliance configured to perform operations comprising:

receiving a packet associated with a communication session of the VM;

identifying an active network interface device of the network appliance that is associated with the communication session, wherein a backup network interface device of the network appliance is also associated with the communication session;

forwarding the packet to the active network interface device for processing the packet associated with the communication session; and in response to determining that the active network interface device has failed, causing subsequent packets associated with the communication session to be routed to the backup network interface device associated with the communication session, thereby allowing the backup network interface device to maintain connection state information and avoid performing connection state processing for the communication session.

Clause 18: The network appliance of clause 17, wherein the identifying is based on an autonomous system number (ASN) prepend that indicates preference of a route.

Clause 19: The network appliance of any of clauses 17 and 18, wherein the routing is performed using a VXLAN tunnel.

Clause 20: The network appliance of any of the clauses 17-19, wherein the determining is based on probing the primary and active network interface device and wherein the causing is based on updating CA to PA mapping.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for managing connection states at an active network appliance and a backup network appliance, the method comprising:

receiving, at the active network appliance, a packet associated with a communication session of a VM in a software defined network (SDN), wherein:

the active network appliance and backup network appliance are configured to process connections in the SDN, the active network appliance is configured to actively process connections and the backup network appliance maintains connection states such that the backup network appliance can actively process the packet associated with the communication session in response to a failure of the active network appliance, and network interfaces from the VM are provisioned on multiple network interface devices at each of the active and backup network appliances;

identifying an active network interface device on the active network appliance associated with the communication session, wherein a backup network interface device on the backup network appliance is also associated with the communication session;

forwarding the packet to the active network interface device for processing the packet associated with the communication session; and in response to determining that the active network interface device has failed, causing subsequent packets associated with the communication session to be routed to the backup network interface device associated with the communication session, thereby allowing the backup network interface device to maintain connection state information and avoid performing new connection state processing for the communication session.

2. The method of claim 1, wherein the identifying is based on an autonomous system number (ASN) prepend that indicates preference of a route.

3. The method of claim 2, wherein the routing is performed using a VXLAN tunnel.

4. The method of claim 1, wherein the determining is based on probing the primary and active network interface device and wherein the causing is based on updating customer address (CA) to physical address (PA) mapping.

5. The method of claim 4, further comprising advertising BGP without prepend by the primary and secondary network interface devices.

6. The method of claim 5, wherein the network appliances are SDN appliances.

7. The method of claim 6, wherein a network interface device on the primary SDN appliance is paired with a network interface device from a backup SDN appliance.

8. The method of claim 7, wherein pairwise flow replication is implemented for each paired network interface device.

9. A system comprising:

an active network appliance; and a backup network appliance;

the system configured to perform operations comprising:

receiving a packet associated with a communication session of a VM in a software defined network (SDN), wherein:

the active network appliance and backup network appliance are configured to process connections in the SDN;

the active network appliance is configured to actively process connections, and the backup network appliance maintains connection states such that the backup network appliance can actively process connections in response to a failure of the active network appliance;

network interfaces from the VM are provisioned on multiple network interface devices at each of the network appliances;

identifying an active network interface device on the active network appliance associated with the communication session, wherein a backup network interface device on the backup network appliance is also associated with the communication session;

forwarding the packet to the active network interface device for processing the packet associated with the communication session; and in response to determining that the active network interface device has failed, causing subsequent packets associated with the communication session to be routed to the backup network interface device associated with the communication session, thereby allowing the backup network interface device to maintain connection state information and avoid performing new connection state processing for the communication session.

10. The system of claim 9, wherein the identifying is based on an autonomous system number (ASN) prepend that indicates preference of a route.

11. The system of claim 10, wherein the routing is performed using a VXLAN tunnel.

12. The system of claim 9, wherein the determining is based on probing the primary and active network interface device and wherein the causing is based on updating customer address (CA) to physical address (PA) mapping.

13. The system of claim 12, wherein the system is configured to perform operations comprising advertising BGP without prepend by the primary and secondary network interface devices.

14. The system of claim 13, wherein the network appliances are SDN appliances.

15. The system of claim 14, wherein a network interface device on the primary SDN appliance is paired with a network interface device from a backup SDN appliance.

16. The system of claim 15, wherein pairwise flow replication is implemented for each paired network interface device.

17. A network appliance comprising a plurality of network interface devices, the network appliance configured to perform operations comprising:

receiving a packet associated with a communication session of a VM of a software defined network (SDN), wherein:

the network appliance is configured to process connections in the SDN, the network appliance includes an active network interface device communicatively coupled to a backup network interface device that maintains connection states such that the backup network interface can actively process connections in response to a failure of the active network interface, and network interfaces from the VM are provisioned on multiple network interface devices at the network appliance;

identifying an active network interface device of the network appliance that is associated with the communication session, wherein a backup network interface device of the network appliance is also associated with the communication session;

forwarding the packet to the active network interface device for processing the packet associated with the communication session; and in response to determining that the active network interface device has failed, causing subsequent packets associated with the communication session to be routed to the backup network interface device associated with the communication session, thereby allowing the backup network interface device to maintain connection state information and avoid performing new connection state processing for the communication session.

18. The network appliance of claim 17, wherein the identifying is based on an autonomous system number (ASN) prepend that indicates preference of a route.

19. The network appliance of claim 18, wherein the routing is performed using a VXLAN tunnel.

20. The network appliance of claim 17, wherein the determining is based on probing the primary and active network interface device and wherein the causing is based on updating customer address (CA) to physical address (PA) mapping.

* * * * *